United States Patent
Jung et al.

(10) Patent No.: US 10,140,367 B2
(45) Date of Patent: Nov. 27, 2018

(54) APPARATUS, METHOD AND COMPUTER PROGRAM PRODUCT FOR CHARACTERIZING AN INDIVIDUAL BASED ON MUSICAL PREFERENCES

(75) Inventors: Peter Jung, Darien, CT (US); Deborah Serianni, Old Greenwich, CT (US); Chris Colborn, Sunnyside, NY (US); William Turnage, Brooklyn, NY (US); Seth Solomon, Brooklyn, NY (US); Michael C. Piccuirro, Cranford, NJ (US); Tye Rattenbury, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 470 days.

(21) Appl. No.: 13/459,390

(22) Filed: Apr. 30, 2012

(65) Prior Publication Data

US 2013/0290348 A1    Oct. 31, 2013

(51) Int. Cl.
*G06F 17/30* (2006.01)

(52) U.S. Cl.
CPC .. *G06F 17/30766* (2013.01); *G06F 17/30017* (2013.01); *G06F 17/30743* (2013.01); *G06F 17/30749* (2013.01); *G06F 17/30775* (2013.01); *G06F 17/30778* (2013.01); *G06F 17/30784* (2013.01); *G06F 17/30805* (2013.01)

(58) Field of Classification Search
CPC ............... G06F 17/30; G06F 17/30761; G06F 17/30766; G06F 17/30778; G06F 17/30784; G06F 17/30799; G06F 17/30805; G06F 17/30749; G06F 17/30775; G06F 17/30743; G06F 17/30017

USPC ........ 707/705–709, 912–916; 715/742–743, 715/748–749, 751, 968
See application file for complete search history.

(56) References Cited

U.S. PATENT DOCUMENTS

| | | | |
|---|---|---|---|
| 7,668,610 B1* | 2/2010 | Bennett | 700/94 |
| 7,899,804 B2* | 3/2011 | Naaman et al. | 707/708 |
| 8,060,461 B2* | 11/2011 | Chi et al. | 707/603 |
| 2002/0057890 A1* | 5/2002 | Iwai et al. | 386/1 |
| 2002/0082901 A1* | 6/2002 | Dunning | G06F 17/30017 705/26.63 |
| 2005/0166065 A1* | 7/2005 | Eytchison et al. | 713/189 |
| 2007/0233726 A1* | 10/2007 | Torrens | G06F 17/30017 |
| 2007/0266021 A1 | 11/2007 | Aravamudan et al. | |
| 2008/0097987 A1* | 4/2008 | Shih et al. | 707/5 |
| 2009/0069913 A1 | 3/2009 | Stefik | |

(Continued)

FOREIGN PATENT DOCUMENTS

WO    WO2009090358 A1    7/2009

OTHER PUBLICATIONS

Michael I Mandel et al., "A Web-Based Game for Collecting Music Metadata", IEEE, Aug. 14, 2008, pp. 1-21.*

(Continued)

*Primary Examiner* — Srirama Channavajjala
(74) *Attorney, Agent, or Firm* — Otterstedt, Ellenbogen & Kammer, LLP

(57) ABSTRACT

Each of a plurality of media clips accessed by a user is scored by analyzing metadata associated with the media clips. A representative subset of the media clips is selected based on the scoring. A visual representation of the representative subset of the media clips is displayed.

29 Claims, 15 Drawing Sheets

(56) References Cited

U.S. PATENT DOCUMENTS

| | | | | |
|---|---|---|---|---|
| 2009/0138505 A1* | 5/2009 | Purdy | ............... | G06F 17/30743 |
| 2009/0164429 A1* | 6/2009 | Svendsen et al. | ................. | 707/3 |
| 2010/0070490 A1 | 3/2010 | Amidon et al. | | |
| 2010/0082585 A1* | 4/2010 | Barsook et al. | ............. | 707/706 |
| 2010/0188405 A1* | 7/2010 | Haughay et al. | ............. | 345/440 |
| 2011/0093492 A1 | 4/2011 | Sull et al. | | |
| 2011/0213475 A1* | 9/2011 | Herberger et al. | ............. | 700/94 |

OTHER PUBLICATIONS

Behavioral targeting, downloaded from http://en.wikipedia.org/wiki/Behavioral_targeting on Mar. 5, 2012.

Contextual advertising, downloaded from http://en.wikipedia.org/wiki/Contextual_advertising on Mar. 5, 2012.

ITunes, downloaded from http://en.wikipedia.org/wiki/Itunes on Mar. 6, 2012.

Collaborative filtering, downloaded from http://en.wikipedia.org/wiki/Collaborative_filtering on Mar. 6, 2012.

Pandora Radio, downloaded from http://en.wikipedia.org/wiki/Pandora_radio on Mar. 6, 2012.

Execution-MiH, downloaded from http://www.executionmih.com/data-mining/propensity-cluster-association-patterns.php on Mar. 6, 2012.

Facebook Platform, downloaded from http://en.wikipedia.org/wiki/Facebook_platform on Mar. 6, 2012.

Global Products & Solutions, downloaded from http://www.mastercard.com/corporate/assets/docs/MC_BusinessUnitDescription_GlobalProductsandSolutions.pdf on Mar. 6, 2012.

Open Graph, downloaded from http://developers.facebook.com/docs/opengraph/ on Mar. 6, 2012.

Spotify, downloaded from http://en.wikipedia.org/wiki/Spotify on Apr. 21, 2012.

ISA/US, International Search Report and Written Opinion, PCT/US13/38674, dated Aug. 28, 2013.

Justtechchannel. iOS App Review—Netflix for iPad. Dec. 20, 2011. [retrieved on Aug. 8, 2013]. Retrieved from the Internet:<URL:http://www.youtube.com/watch?v=F-4_ADXYT3E>.

* cited by examiner

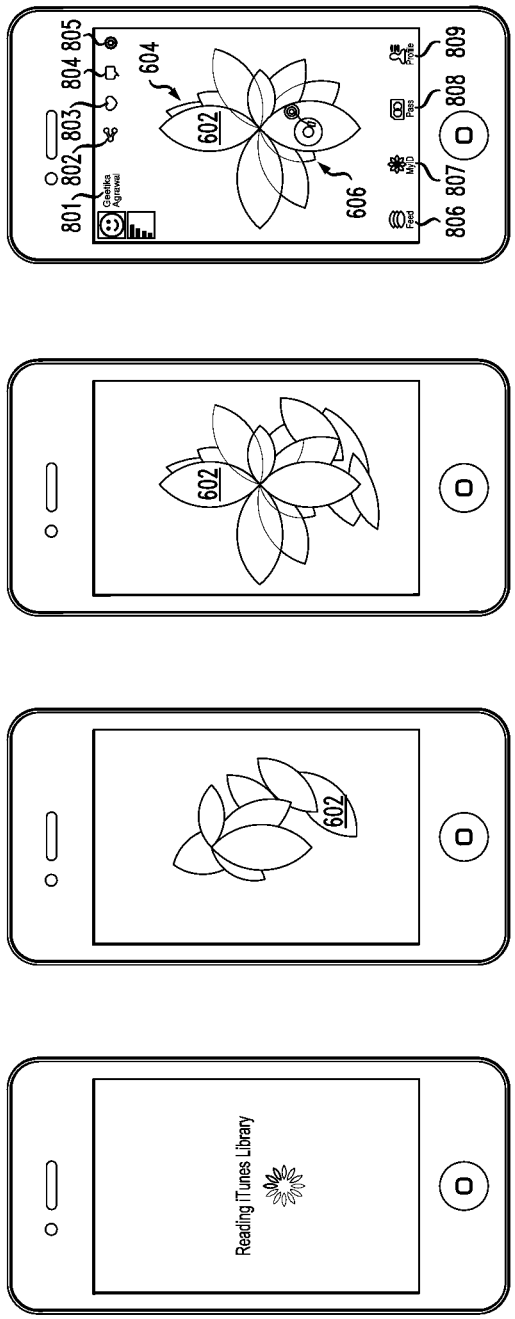

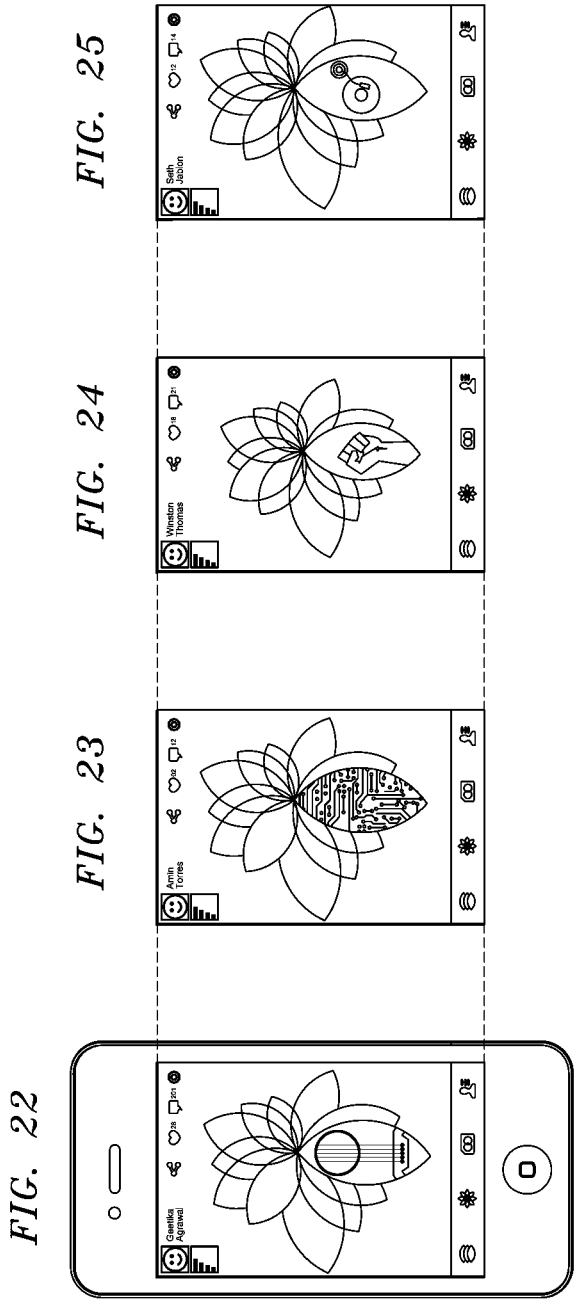

FIG. 30
FIG. 31
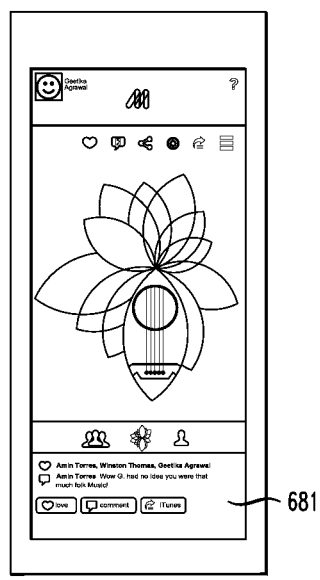
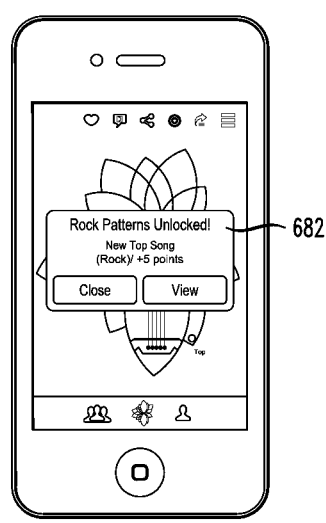

APPARATUS, METHOD AND COMPUTER PROGRAM PRODUCT FOR CHARACTERIZING AN INDIVIDUAL BASED ON MUSICAL PREFERENCES

FIELD OF THE INVENTION

The present invention relates generally to the electronic and computer arts and, more particularly, to digital music players and the like.

BACKGROUND OF THE INVENTION

Digital music players have become ubiquitous. Such players, also referred to as portable media players (PMP) or digital audio players (DAP), are consumer electronics devices that store and play digital media such as audio, images, video, documents, and the like. A non-limiting example is the iPod® brand of portable media players created and marketed by Apple Inc., Cupertino, Calif., U.S.A. Other types of electronic devices like cellphones, internet tablets, and digital cameras are sometimes referred as PMPs because of their playback capabilities. Furthermore, personal computers are typically equipped with software which permits playing digital media, such as Windows Media Player® available from Microsoft Corporation, Redmond, Wash., U.S.A., and iTunes® software available from Apple Inc.

The "Genius" feature of Apple's iTunes software automatically generates a playlist of songs from a user's library which are similar to a selected song, making use of a ratings system and collaborative filtering.

Pandora® Internet Radio is an automated music recommendation service. The service plays musical selections similar to song suggestions entered by a user. The user provides positive or negative feedback for songs chosen by the service, which are taken into account for future selections. While listening, users are offered the ability to buy the songs or albums at various online retailers.

SUMMARY OF THE INVENTION

Principles of the invention provide techniques for characterizing an individual based on his or her musical preferences.

In one aspect, an exemplary method includes scoring each of a plurality of media clips accessed by a user by analyzing metadata associated with the media clips; selecting a representative subset of the media clips based on the scoring; and displaying a visual representation of the representative subset of the media clips.

In another aspect, another exemplary method includes scoring each of a plurality of media clips accessed by a user, based at least on play count. Each of the media clips has a corresponding one of a plurality of genres. Further steps include scoring each of the plurality of genres based at least on the play count for those of the media clips contained therein; and selecting a representative subset of the media clips having a distribution of the genres based on the step of scoring each of the plurality of genres.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including:
- visualization of musical preferences for the hearing-impaired;
- ability to take data from various sources (operating system of a digital music player, Internet-based video-sharing web site, Internet-based social-networking service, Internet-based music streaming service, and the like) and provide one output reflecting a user's listening habits.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 5-8 depict exemplary screen shots of booting-up process for a portable media player, in accordance with an aspect of the invention, including a visual characterization of a person's musical tastes;

FIGS. 19-25 show screen shots of the player of FIGS. 5-8 in connection with a personalization process including customization of IDs;

FIG. 30 shows a screen shot of the player of FIGS. 5-8 in connection with a social interaction process;

FIG. 31 shows a screen shot of the player of FIGS. 5-8 in connection with a notification message of a change in an individual's musical identity;

DETAILED DESCRIPTION OF PREFERRED EMBODIMENTS

Figure 1:
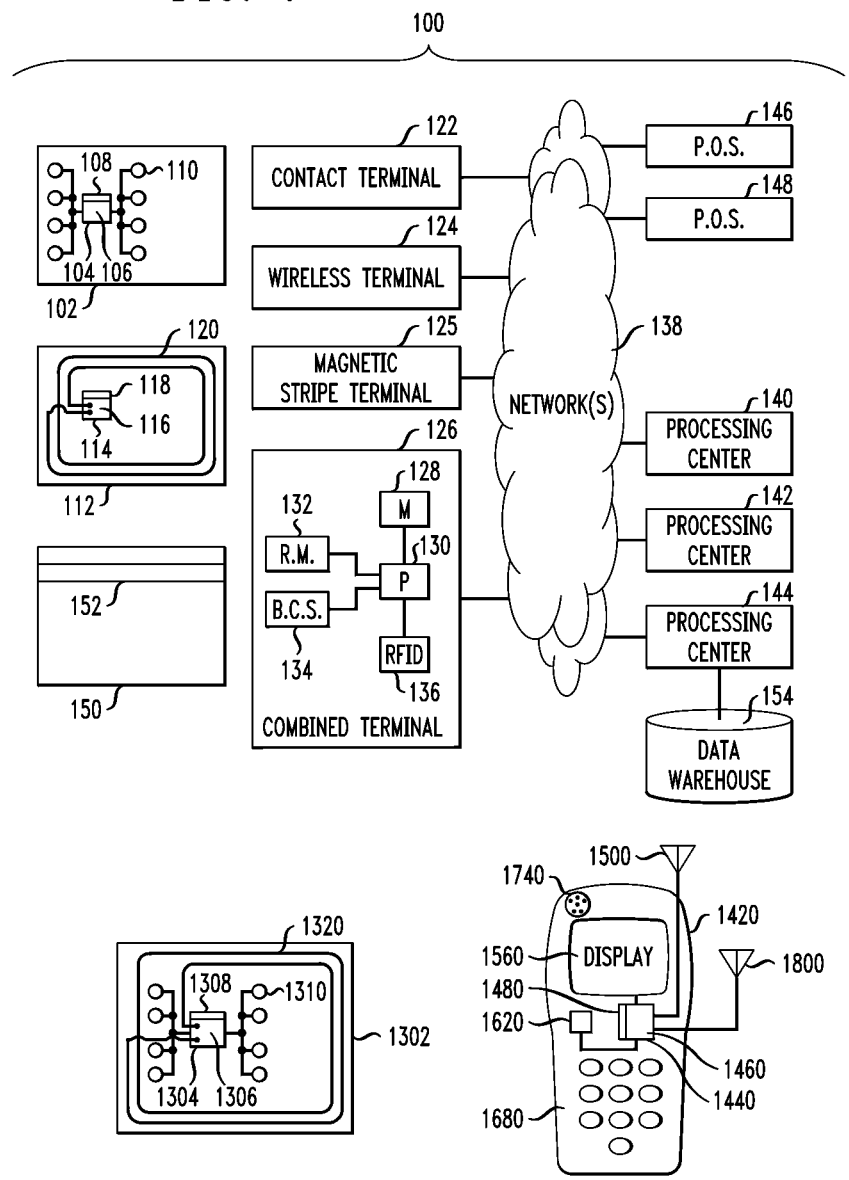
FIG. 1 shows an example of a system and various components thereof that can implement techniques of the invention.

Attention should now be given to FIG. 1, which depicts an exemplary embodiment of a system 100, according to an aspect of the invention, and including various possible components of the system. In this regard, one or more embodiments of the invention are generally applicable to portable media players, cellphones, internet tablets, personal computers with software which permits playing digital media, devices playing streaming media, and the like. Some specific aspects involve the operator of a payment network; e.g., an entity such as MasterCard International Incorporated, operator of the BANKNET® network, or Visa International Service Association, operator of the VISANET® network. This should be kept in mind in connection with the description of FIGS. 1 and 2.

System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate approach, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 1420. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

A dual-interface device 1302 is sometimes employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in a number of embodiments. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided. Many current devices omit keypad 1680 and employ a touchscreen instead.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
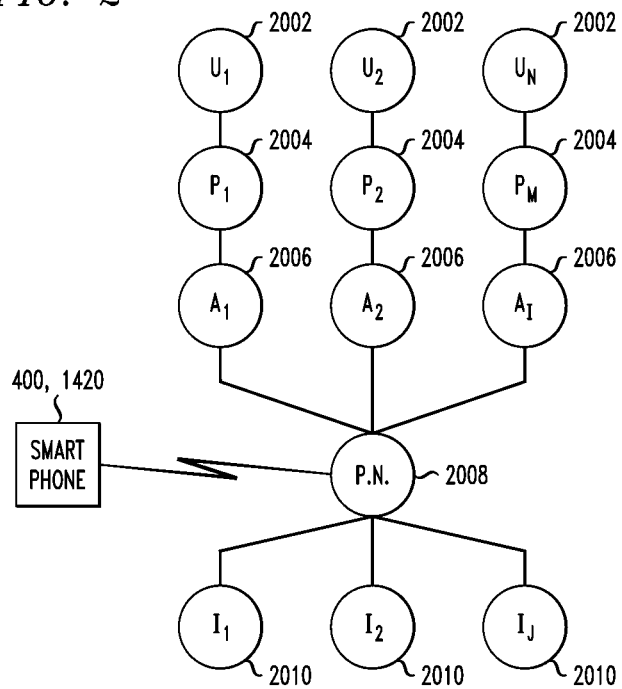
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the aforementioned BANKNET® network, or Visa International Service Association, operator of the aforementioned VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer.

As seen in FIG. 2, in some instances, the owner or user of a smart phone 400, 1420 or similar device configured in accordance with one or more embodiments of the invention accesses a web site or the like of the payment network operator 2008 to download a suitable application 421, discussed below, to the smart phone 400, 1420 or similar device. This feature is optional. Note that the connection between phone 1420 and payment network operator 2008 may very well be indirect; for example, payment network operator 2008 may provide a "golden copy" of the application 421 to a third party (e.g., APPLE ITUNES STORE or Google's ANDROID MARKET) and phone 400, 1420 downloads over the web from such third party. The link shown between phone 400, 1420 and payment network operator 2008 also represents the flow of data to payment network operator 2008 for purposes of developing offers, as will be discussed further below, and may be direct or indirect; for example, via a cellular network and possibly with one or more intermediate parties. The link is also indicative of a link to a social network site such as the Facebook® social networking service (Facebook, Inc., Menlo Park, Calif., U.S.A.) or the like, as will be discussed further below.

Figure 37:
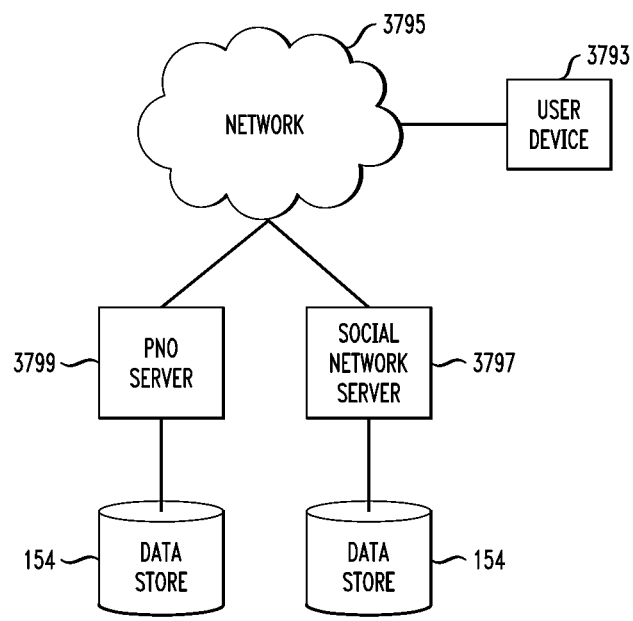
FIG. 37 is a block diagram showing exemplary data flow between a user's device, Internet-based social-networking service, and a server operated by or on behalf of the operator of a payment network.

Reference should now be had to FIG. 37. User device 3793 is representative of device 400, device 3600, or a laptop or desktop computer 300, for example. Device 3793 is in communication with a server 3799 of the payment network operator and/or a server 3797 of the social networking service over network 3795 (e.g., the Internet). Servers 3799 and 3797 each have a data store 154 to store pertinent data.

One or more embodiments make use of metadata from the user's mobile device and digital media player (e.g., APPLE iTunes program) account or music streaming service account (e.g., Spotify, Pandora, or the like). In one or more embodiments, the payment network operator (PNO) 2008 will host the data from the musical IDs discussed herein; for example, in data store 154 coupled to server 3799.

In one or more embodiments, users unlock access based on their behavior: how much they are sharing, posting, and listening. Some embodiments involve targeted distribution of offers or content based on the metadata or data housed and stored by the PNO. For example, everyone who has an interest in a given genre will receive a notification regarding a concert or other experience relevant to those people that are interested in that genre of music. A user may log into a social networking web site using a mobile browser on a smart phone, or may press a button that enables the data to be uploaded over the Internet. In a preferred approach, at least pertinent portions of the data are transferred to server 3799 operated by or for PNO 2008. In another approach, data remains on server 3797 run by the social media site but access is provided to the PNO 2008 (for example via network 3795—the same or different networks may be used to provide connectivity between and among the entities 3793, 3799, 3797).

A variety of techniques can be used to share information between the smart phone or other device 3793, social networking service on server 3797, and the PNO's server 3799, depending on the final hosting solution selected in a given embodiment of the invention.

In some instances, the user is taken to the social networking application on server 3797 to log in, and then brought back to application 421 or 3621 described elsewhere. The PNO may "grab" some of the social networking data about the user and store it in a backend application running on server 3799. When a user shares a Music ID, the data for that ID is posted to the backend application on server 3799 and then stored in database 154 coupled to server 3799. Then, a link to it is posted on the social networking site running on server 3797. When a user views a feed, the PNO produces a list of that user's friends' posts from the (preferably Java) backend application on server 3799. When users like or comment on a post, the PNO posts that directly to the social networking application on the server 3797. In some instances, the PNO crawls all the Music IDs in the database 154 coupled to server 3799 to produce a list of popular songs.

Figure 4:
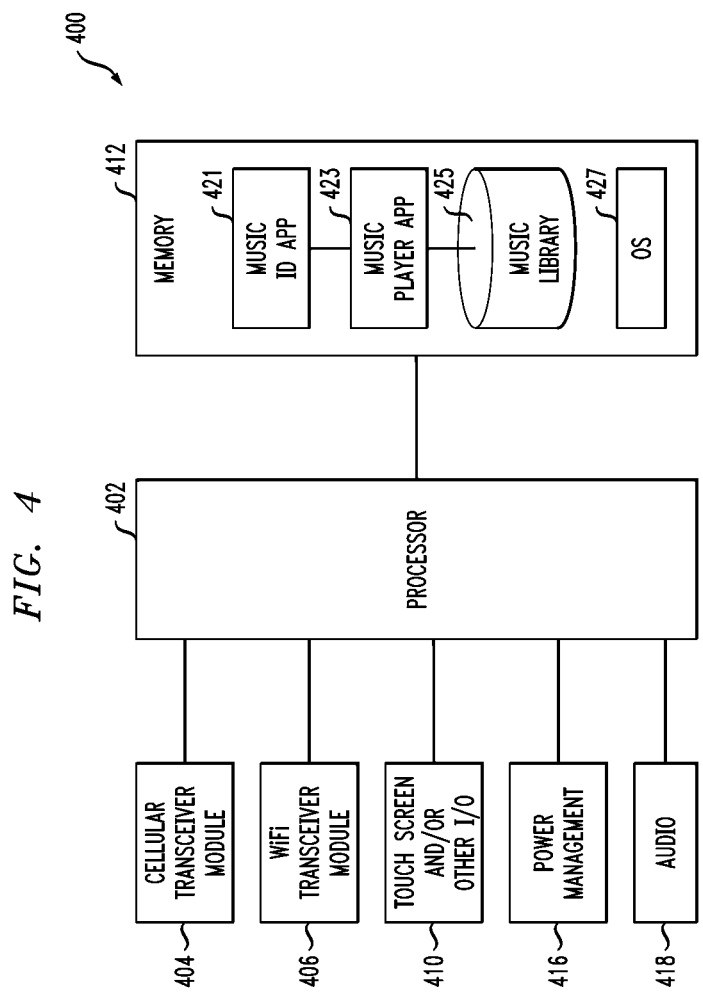
FIG. 4 is a block diagram of a "smart" phone or tablet computer configured in accordance with another aspect of the invention.

FIG. 4 is a block diagram of an exemplary tablet computing device or smart phone 400 or the like. Unit 400 includes a suitable processor; e.g., a microprocessor 402. A cellular transceiver module 404 coupled to processor 402 includes an antenna and appropriate circuitry to send and receive cellular telephone signals, e.g., 3G or 4G. A WiFi transceiver module 406 coupled to processor 402 includes an antenna and appropriate circuitry to allow unit 400 to connect to the Internet via a wireless network access point or hotspot. The skilled artisan will appreciate that "Wi-Fi" is a trademark of the Wi-Fi Alliance and the brand name for products using the IEEE 802.11 family of standards.

One or more embodiments include a musical identity application 421 in memory 412 which when executed causes the processor 402 to implement at least a portion of the functionality described herein. Application 421 interfaces with a music player application 423 such as iTunes or the like stored in memory 412 and executable on processor 402. Such interface may be effectuated, for example, using one or more application programming interfaces, shared data structures, or the like. Music player application 423 in turn accesses music in music library 425 for playback to a user. Operating system 427 orchestrates the operation of unit 400. Apple's iOS is a non-limiting example of a suitable operating system.

Figure 36:
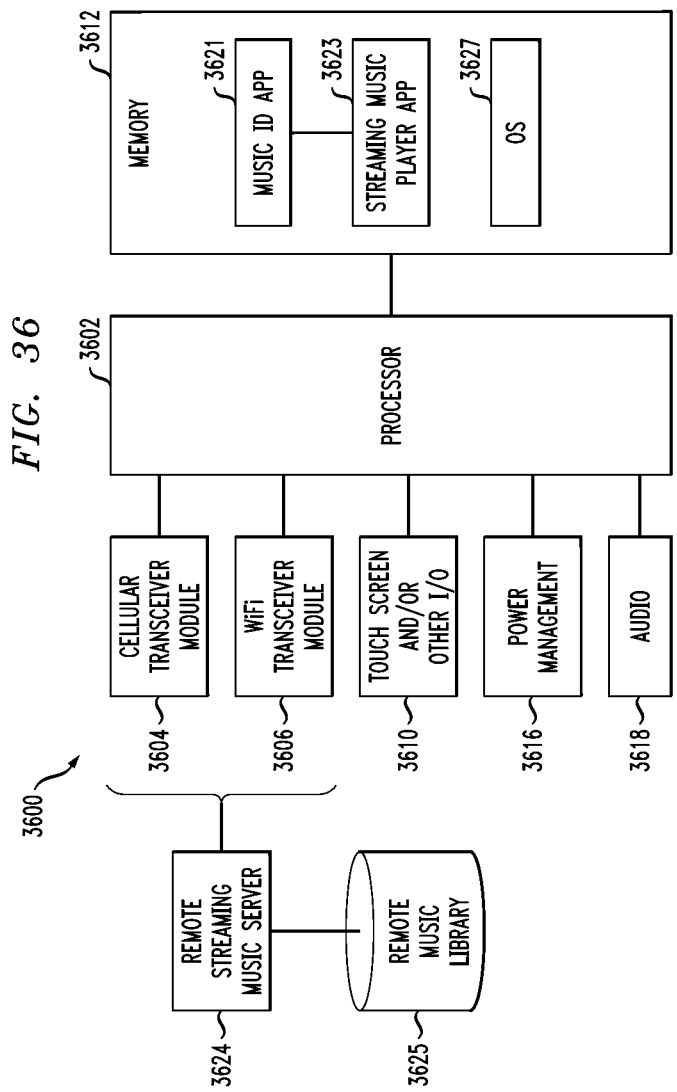
FIG. 36 depicts an alternative embodiment in the context of an Internet-based music streaming service, in accordance with another aspect of the invention.

With further regard to music library 425, in a broader aspect, a variety of music sources can be employed; for example, data from a music streaming service such as the Spotify™ service (mark of Spotify Ltd., London, UK) could be obtained through an application program interface (API) or the like—see FIG. 36.

Touch screen 410 coupled to processor 402 is also generally indicative of a variety of input/output (I/O) devices such as a keypad, another type of display, a mouse or other pointing device, and so on, all of which may or may not be present in one or more embodiments. Audio module 418 coupled to processor 402 includes, for example, an audio coder/decoder (codec), speaker, headphone jack, microphone, and so on. Power management system 416 can include a battery charger, an interface to a battery, and so on. Memory 412 is coupled to processor 402. Memory 412 can include, for example, volatile memory such as RAM, and non-volatile memory such as ROM, flash, or any tangible computer-readable recordable storage medium which stores information in a non-transitory manner. Processor 402 will typically also have on-chip memory.

Thus, one or more embodiments may be implemented, for example, via an application that runs on a tablet or smart phone or the like and another application that runs on a remote server or the like. One or more embodiments are directed to a social and/or mobile application and/or platform. One or more embodiments involve the concept of a musical identity (Music ID) based on the concept that "you are what you listen to." This Music ID is akin to "musical DNA." In general, no two people have the exact same sort of music DNA. For example, even if two people had the same albums or songs in their music library 425, they would still almost certainly have different musical DNA because the order in which they listen to the songs, the frequency of play of songs, and so on, will typically always be different (in an optional alternative approach, how long the songs have been in their libraries can also be taken into account).

Some embodiments take into consideration how long songs have been in a person's music library, the order in which he or she listens to songs; the frequency at which he or she listens to songs, and so on. Based on such factors, every time application 423 opens, application 421 is invoked and application 421 prepares a visualization of the user's musical identity (see discussion of FIGS. 5-8 below); for example, in the form of a visualization of a pre-determined representative number of songs (by way of example and not limitation, twelve) that represent who the user is based on where he or she is at this point in terms of his or her music listening profile. This visualization can be thought of as an expression of the user's personal brand. Some embodiments are highly integrated with social networks such as Facebook and permit some or all of the people in a user's social network community or circle, who also have a Music ID, to view, share, compare and discover music and chat about related matters.

One or more embodiments are directed to one, some or all of:

determining the musical ID creating a visualization of the musical ID—one or more embodiments provide a visual, interactive, and/or animated personal moniker; the illustration or visualization of what the musical ID is.

making targeted offers based on the musical ID.

For example, suppose an individual lives in Mexico City and the New York Philharmonic is in the individual's music ID. Further, suppose the New York Philharmonic will be making a cultural exchange visit to Mexico City and they will perform at a concert hall in Mexico City. Yet further, suppose that an entity such as a payment network operator 2008 is a partner of the concert hall in question. The entity may have one or more rights, benefits, and/or experiences that they can offer to the individual. Examples include pre-sales tickets available before the general public can buy them; an opportunity to have an exclusive video chat with the musician's prior to the concert; an opportunity for the most loyal consumers to a private VIP meeting with the conductor or musician's, and so on. One or more embodiments thus deliver content, offers, and/or experiences based on the Music ID.

Thus, in one or more embodiments, the user has a device, such as a portable device, that plays music (e.g., Apple iPod® device, a smart phone, or the like). An application 423 and/or 421 on the device keeps track of what the user is playing, how many times he or she plays it, and when the last time he or she played it was. Each song is characterized by genre, using metadata. Every time the application 423 is started, the Music ID calculation is redone by application 421.

In some cases, the Music ID is generated by identifying a first group of "top" songs (by way of example and not limitation, 30) in music library 425, based on the number of plays for each song. Then, a representative number of "top" songs are identified; the representative number of songs is less that the first group (by way of example and not limitation, 12). However, this representative number of "top" songs is not necessarily, for example, just the top 12 most played songs but is selected, as described in greater detail below, as the 12 (for example) songs that represent the individual's music ID (based on several different dimensions; for example, 4).

In one or more embodiments, based on this representative number of "top" songs, application 421 shows the user a corresponding identity based on same. As discussed further below, in some instances, the corresponding identity is in the form of a flower-like display with individual petals or guitar-pick shaped elements (e.g., 12) corresponding to each song in the second number of "top" songs. The size of each petal- or pick-like element is based on the frequency with which the user plays each song and/or how recently the song has been played; and the color of each petal- or pick-like element is based on the genre of the song. Some embodiments also include customization elements.

In some instances, the available genres are:
1. rock
2. pop
3. indie
4. electronic
5. Latin
6. folk
7. Rhythm and Blues (R&B)
8. ambient
9. Reggae
10. alternative
11. hip hop/rap 12. jazz
13. blues
14. world
15. classical Other genres could be included in other instances; for example, country and western.

In addition to the visual representation, another aspect in some instances involves offering goods, services, tickets, experiences, or the like based on the musical identity.

It is worth noting that the Music ID is typically dynamic. Assuming that the user is constantly listening to music from his or her device, his or her Music ID will vary with time. For example, suppose the individual last opened application 423 on Friday and since then has listened to more Reggae music than before. Some picks or petals may drop off the flower, some may be reduced in size, some will increase in size, and some may appear for the first time, all based on the techniques described herein. In some instances, the user is afforded an option to automatically have his or her Music ID populated to his or her Facebook or other social media page. In some instances, the updated Music ID will also automatically synchronize to other people in the user's Facebook or other social media community, so that the user will be able to compare profiles or IDs, see who has updated his or hers, compare to who else has a particular song, and so on. See, e.g., discussion of FIGS. 11-16, FIG. 30, and FIGS. 32-33.

In one or more embodiments, a repository of Music IDs is collected in data warehouse 154 or the like, and the data is employed to carry out propensity modeling; i.e., a determination is made that people who have IDs satisfying certain criteria probably would like to shop in a certain store. Of course, data should be gathered only in accordance with all applicable, laws, rules, regulations, consent and privacy policies and procedures. Responsive to such propensity modeling based on Music ID, an offer can be sent to the user to buy a certain product in the identified store.

Data mining propensity modeling is, in and of itself, known to the skilled artisan. In some instances, all the pertinent shared ID data (e.g., metadata associated with the music MP3s) is stored in a centralized database such as 154, which allows data mining on the entire community. In a preferred but non-limiting embodiment, raw numerical data, such as actual songs and/or counts, genres, relative scores of genres, and so on is stored, as opposed to data characterizing the "flower" per se. Propensity modeling works on discovering a natural inclination or tendency across variables. Pertinent techniques include Cluster Analysis, Association Analysis and Sequential/Temporal patterns. Thus, the Music ID for many individuals could be placed in a database and clusters of individuals with like musical tastes could be developed; an association function could be used to identify affinities or patterns; and/or or sequential and/or temporal pattern functions could be used to analyze the database records over a period of time to identify trends. Any of these could be the basis for targeted marketing efforts or the like.

Thus, one or more embodiments employ business rules, business logic, pattern recognition technologies, and the like.

Figure 34:
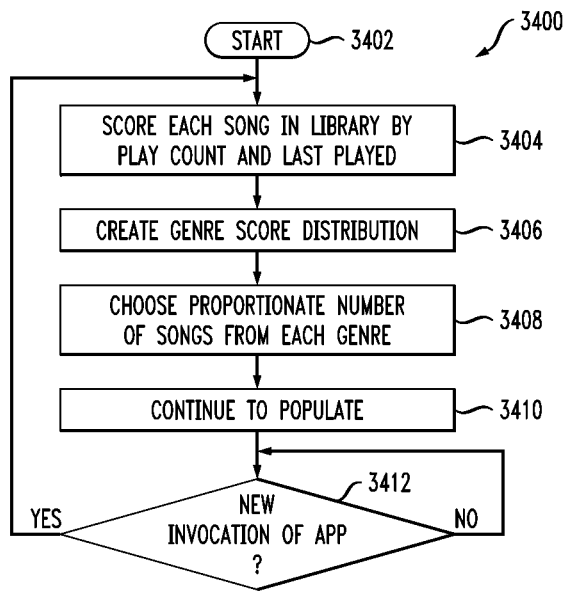
FIG. 34 presents a flow chart illustrating exemplary method steps, according to an aspect of the invention.

Referring now to flow chart 3400 of FIG. 34, which begins at 3402, in step 3404, score each song in the library 425 by last played and play count (in some embodiments, date added to the library is not used; in other instances, this could be taken into account).

Last played takes into account recency in listening habits. For example, a song may have been listened to 1000 times but not have been listened to in the past year. If one song has been listened to 1000 times but not in the last year, and another song has been listened to 1000 times and the most recent play was yesterday, the latter song will be weighted more heavily than the former. In one or more embodiments, weight is given to each of the factors in accordance with the following exemplary code segment:

```
float sigmoid(float x, float lam)
{
    return (2.0/(1.0+exp(-2.0*lam*x))-1.0); }
+(float)getScore:(int)playCount:(NSDate *)lastPlayed:(NSDate *)
+currentTime {
    int lastPlayedINT = [lastPlayed timeIntervalSince1970];
    int currentTimeINT = [currentTime timeIntervalSince1970];
    float x = sigmoid(playCount, 0.1);
    float y = sigmoid((currentTimeINT-lastPlayedINT)/60.0/60.0/24.0,
    0.05);
    float returnValue = x/(1.0+y) * 10;
    return returnValue;
}
```

As noted, one or more embodiments can be implemented, for example, in a smart phone with music playing capability. In some cases, an iPhone® device, iPod® Touch device, or other platform utilizing the Apple iOS operating system is employed. In one or more embodiments, the play count for each song is known from the music player application 423. For example, developers of iOS applications are allowed to see the play count information. In some instances, developers have access to variables from application 423 such as name of song, number of plays, and time of most recent play.

In one or more embodiments, a determination is made as to the percentages for each genre, based on the entire library. For example, looking at every song in the library, it is determined that the genres are 50% rock, 30% folk, 15% jazz, and 5% classical, even though no jazz or classical selections are in the top 30 songs (see discussion below).

In step 3406, create a genre score distribution by summing the scores of songs within each genre. In this regard, most of the music on a phone or other device typically has metadata associated with it that is part of the file. For example, if an individual purchases a track off the iTunes® store, there is metadata attached to the file. The genre can be read from this metadata. Some tracks may not have metadata available. In such cases, application 423 may go online to access a site such as the Apple iTunes Store or the like and try to search for a given song and see if the genre can be determined. In some cases, application 421 may use top-level genres. For example, there may be several hundred genres in an application such as iTunes but this number may be excessive in some cases so only top-level genres may be employed. Furthermore in this regard, in iTunes, one rock song may be under the genre "heavy metal" and one rock song may be under the genre "punk rock" but both songs may be treated by application 421 as belonging to the top-level genre "rock."

Thus, in one or more embodiments, in step 3404, go through all of the songs in library 425 and the number of times each song was played and group them together by genre. Then, in step 3406, within each genre, add up all the play counts. For example, if an individual listens to three songs five times each in the same genre (Genre A), that genre will have a score of 15. If the individual listens to ten songs once each in a different genre (Genre B), that genre will have a score of 10. So in Genre A, the individual has listened to fewer songs but since he or she has listened more times, Genre A will have a higher overall score than Genre B.

So, for example, there may be a genre an individual does not like very much but there may be one song he or she really likes in that genre and he or she may play it one thousand times; in such a case, that genre could still score highly as compared to one where the individual listens to hundreds of songs a few times each.

In one or more embodiments, obtain the highest scoring songs for each genre, but only the top song per artist. Thus, if the top few scoring songs are the same artist, all songs for that artist but the first song for that artist will be ignored.

In step 3408, choose the most recently played songs from each genre so that the final representative list has the same proportion of songs from each genre as the genre score distribution (e.g., if Hip-Hop has 50% of the score distribution, 6 of the 12 songs in the final representative list should be from Hip-Hop, assuming the total number of songs in the final representative list is to be 12). In some cases, for efficiency, the 12 songs are searched for first in a first group of top (e.g. N=30) scoring songs.

Thus, steps 3404 and 3406 are used to "whittle down" the entire library 425 by ranking all the songs (say 5000) from most to least popular. At that point, in some cases, take the top 30 songs and use them to create a top 12 list. However, this is not done by simply taking songs 1-12. Instead, take the top 30 songs and look at them more closely to determine what the new top 12 should be.

By way of an example, suppose an individual's top 30 songs are rock songs in places 1-20 and classical songs in places 21-30. Since only ⅔ of the top 30 is rock, only ⅔ of the top 12 will be rock. The idea is to make the top 12 (or other preselected number) more balanced that if just the top 12 most played were chosen. That is to say, in this particular example, discard some of the rock songs that might otherwise monopolize the top 12 and include ⅓ classical songs.

Again, 12 and 30 are non-limiting exemplary numerical values.

In some instances, choose the most recently played songs from each genre that is represented in the top 30 (or other number). For example, suppose an individual listens to rock, folk, jazz, and classical but primarily rock and folk and there is no jazz or classical in this individual's top 30 (or other number). In some cases, there will not be any jazz or classical in this individual's final 12; the same will be exclusively rock and folk.

On the other hand, in a preferred approach, the genre proportion for the final 30 (or other number) comes from the whole library 425. Again, for the sake of argument, that an individual has songs from 4 different genres, say, rock, folk, jazz, and classical. Assume that of the top 30, 20 are rock and 10 are folk and there is no jazz or classical in the top 30. So, when choosing the most recently played songs from each genre so that the final list has the same proportion of songs from each genre as the genre score distribution, there would be some genre score for jazz and some genre score for classical which would be much lower than the genre scores for rock and folk. Say, one of the 12 songs is a classical track, because 1/12 of the library 425 is classical, even if this classical song is number 284 in the overall scoring list. This is an example of continuing to populate in step 3410. In essence, divide up the top 12 and assign a genre to each of the top 12 tracks and fill in the tracks based on the top scoring of each genre. For example, if the overall library 425 is 1/12 jazz, 1/12 classical, 7/12 rock and 3/12 folk, then there are one classical song, one jazz song, 7 rock songs, and 3 folk songs in the top 12. The top 12 songs are populated with the top 7 rock songs, top 3 folk songs, top jazz song, and top classical song. In this aspect (genre proportion for the final 30 (or other number) comes from the whole library), it is possible to search the entire library for the songs to fill in the top 12, or to search some subset (say, the top 30) to see if the correct songs to fill in the top 12 are available therein, and only look to the rest of library 425 if that is not the case. In this aspect, if the top 30 have enough songs from each genre to fill out the top 12 list, then proceed. However, if there are not enough (say, in the example, no jazz or classical in the top 30), then look for the top jazz and top classical songs in the library as a whole. In one or more embodiments, it is known that a jazz and a classical are needed, because the entire library is scanned to determine the percentage for each genre. That is to say, scan a user's library; a genre may not be in the final Music ID "flower," but data for it still gets stored (so as to determine an accurate genre percentage of the library).

In step 3410, if the process runs out of songs before filling the final list, continue to populate the final list by choosing the top scoring songs.

At decision block 3412, await the next start-up of application 423 and repeat the calculations for the new data.

Thus, a score is generated for each song based on play count and last played as discussed above. The highest scoring songs in the genre are selected to represent that genre.

As noted, one or more embodiments create a "flower" graphic from petal- or pick-like elements correlating to the songs in the top 12 (or other number). This provides a pleasing way to visualize the result of method 3400 as musical DNA. Every Music ID, and every visualization thereof, is different; because of frequency and order it is very unlikely any individual would have the same exact Music ID with anyone else.

Typically, every time player 423 is activated, assuming the user has listened to music in the interim, application 421 will calculate a different Music ID—the Music ID evolves through time (however, it is theoretically possible, although unlikely, that the user may listen to the same songs in the same frequency over time so as to create the same ID). Furthermore, one or more embodiments are integrated with social media web sites such as Facebook (for example, Open Graph protocol and/or timeline functionality thereof) so people can go back and in addition to recalling memories based on pictures and posts they can also reflect on their Music IDs at a given point in time. See, e.g., FIGS. 26-29. This may help individuals to pleasantly recall friends, jobs, places frequented, and the like from times past.

It should also be noted that in some instances, offers are not targeted, but may be sent globally to all users who opt in to the Music ID service (for example by downloading application 421). On the other hand, as noted elsewhere, in some instances, the Music ID can be the basis for targeted offers using techniques such as propensity modeling, benchmarking, categorizing IDs, and the like; in general, making assumptions or modeling that say, in essence, if someone has a certain kind of Music ID he or she might like an offer of a certain kind. In some instances, use can be made of Enterprise Marketing Platform products and/or services available from MasterCard Global Products & Solutions, MasterCard International Incorporated, Purchase, N.Y., USA, or a similar customer relationship management engine or hub. Preferably, a database of consumers with application 421 is built over time to provide sufficient data to work with.

In one or more embodiments, the score per se is not stored but is just used to determine songs in the Music ID. In one or more embodiments, the size of a petal is determined by play count and social network comments are based on viewing friends' Music IDs.

Thus, by way of review, the genres in the list are chosen based on the current listening habits of the user. Songs from these genres are selected using a score, determined by a combination of play count and the last time the song was played.

Turning now to FIG. 5, non-limiting exemplary descriptions of a UI afforded by unit 400 or the like will now be provided. In FIG. 5, application 421 reads the data about song popularity from library 425, typically via music player application 423. Screen shots of a smart phone 400 or the like are depicted. The notation "Reading iTunes Library" is exemplary and non-limiting; other music players can be used. In FIGS. 6 and 7, a graphic depicting the top 12 (or other number) of songs begins to form. The graphic includes petal- or pick-like elements 602, one for each song. The color of the petal is unique to the genre of the corresponding song. The size is based on the number of plays; the greater the number, the larger the petal or pick. The final graphic, in the form of a flower 604 formed by the petals or picks 602, is shown in FIG. 8. The largest petal or pick, representing the most popular of the 12 (or other number) of representative songs may receive a prominent location (e.g., a 6 o'clock position as shown in FIG. 8) and can further include, for example, a badge 606 or the like (here, a depiction of a turntable). The user's name is shown at 801. A universal sharing symbol is shown at 802 and is an icon that can be selected to share data with friends or the like. A "like" button is shown at 803 and may be selected to indicate that a given song is enjoyable to the user; in some instances, a custom icon can be used for this purpose. A comment bubble is shown at 804 and may be selected to post comments to a social networking site and/or to application 42. A customization icon is shown at 805 and may be selected to activate the customization process described elsewhere herein; i.e., to customize the flower petals, background artwork, and the like. A feed icon is shown at 806 and may be selected to show the activities of friends utilizing application 42 and their IDs, preferred songs, videos, etc. A "MyID" icon 807 may be selected to show the user the details of his or her ID. A gated offer icon 808 may be selected to show special offers, benefits, or the like available only to cardholders of a brand of payment cards corresponding to PNO 2008. A profile icon 809 may be selected to show the user terms and conditions, help screens, current point score, and the like.

Please note the "smiley face" icons are used throughout to represent thumbnail photos of the actual users.

Figure 12:
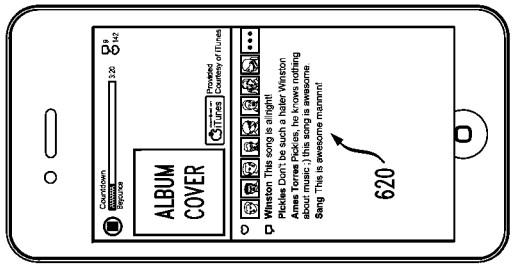
FIGS. 11-16 show screen shots of the player of FIGS. 5-8 in connection with various social interaction processes.
Figure 11:
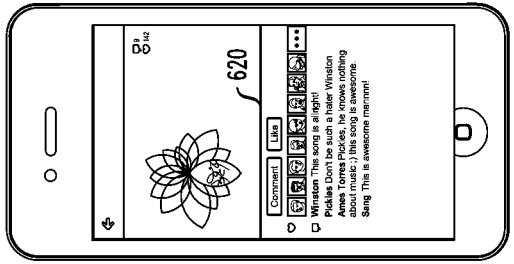
Figure 10:
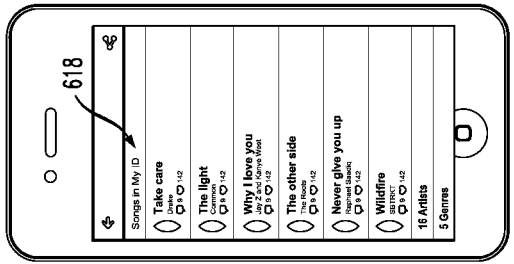
FIG. 10 shows a screen shot of the player of FIGS. 5-8 in connection with a list of songs associated with an individual's current musical identity.
Figure 9:
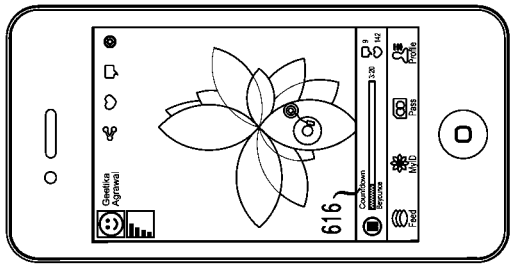
FIG. 9 shows a screen shot of the player of FIGS. 5-8 in connection with a currently-playing song.

In FIG. 9, the most popular song is playing, and is listed at 616. In FIG. 10, the 12 (or other number) of representative songs, corresponding to the picks or petals, are presented in a list form 618. In FIGS. 11 and 12, a chat 620 among friends is based on viewing each other's Music IDs. In one or more embodiments, this is implemented by the social networking site's API. Create an item in the social networking application and track likes and comments on it. Then, pull that into application 421. It is also possible to post likes and comments within the application 421.

The "Album Cover" in FIG. 12 generically represents an image associated with the song currently playing, such as artwork from a CD on which the song appears or an image in a database or the like that is associated with the song.

In some cases, the user is given an indication of others who are friends at a social media web site and who have similar music in their Music IDs. In some cases, the flower-like visualizations of the Music IDs of these friends are displayed, together with the names of the friends. In some cases, the user and his or her friends are presented in list form, with the user at the top, and including names, photos, and top songs in their Music IDs.

Figure 16:
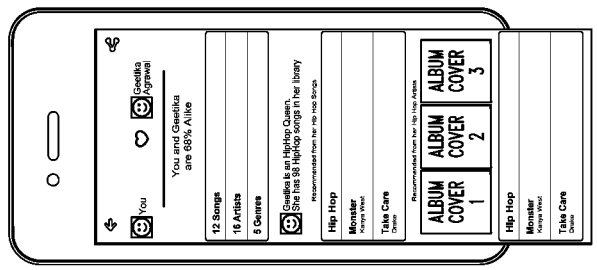
Figure 15:
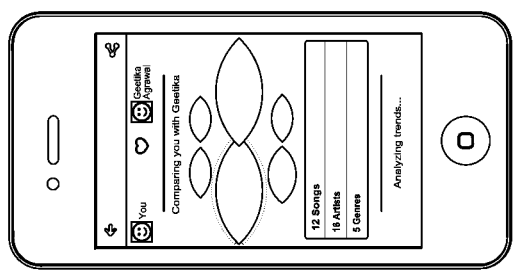
Figure 14:
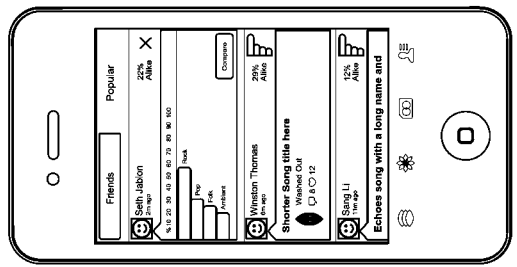
Figure 13:
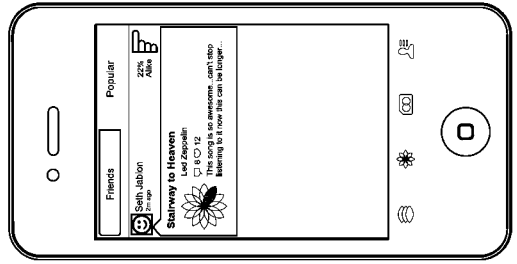

In FIG. 13, a user comments on a particular song. In FIG. 14, a friend's relative genre percentages are displayed. In FIG. 15, statistics for the user are compared to statistics for one of the friends. FIG. 16 shows comparison with a friend; i.e., comparing one's music and ID to that of a friend. "Album Cover 1," "Album Cover 2," and "Album Cover 3," in FIG. 16 generically represent images associated with recommended artists, such as artwork from a CD or an image in a database or the like that is associated with the artist or one of his or her songs. The artists' names may also be displayed, if desired, in association with the images.

Figure 17:
FIGS. 17-18 show screen shots of the player of FIGS. 5-8 in connection with targeted offers.
Figure 18:
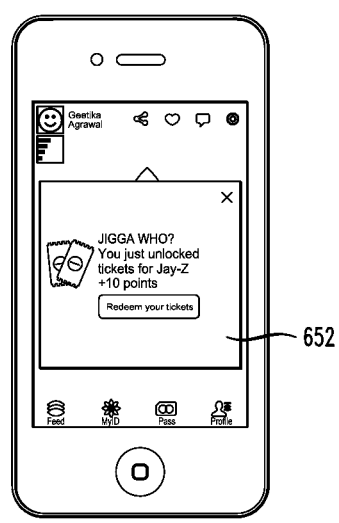
Figure 35:
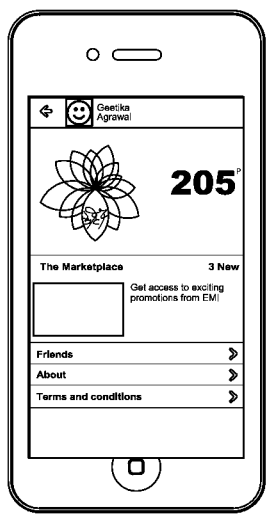
FIG. 35 depicts an exemplary gamification process.

FIG. 35 depicts an exemplary gamification process. Gamification encourages use within an application or a game; say, induce the user to take an action such as 'liking" a friend's song—the user may earn a point for taking such an action. By accumulating points, the user is afforded an opportunity to unlock custom artwork, song downloads, or the like. In general, users are given the opportunity to earn points and levels. Points can be accrued, for example, by listening to music, sharing music, buying music, posting music, and the like; for example, by listening behavior on a smart phone or other device and by sharing behavior through a social networking site. Accrued points may provide a user with enhanced status and/or may unlock features such as limited access experiences, free songs, and the like. As seen in FIGS. 17 and 18, the user receives rewards 650, 652 in the form of points, artwork, and or tickets.

Figure 21:
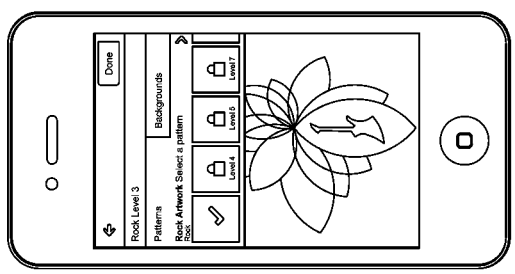
Figure 20:
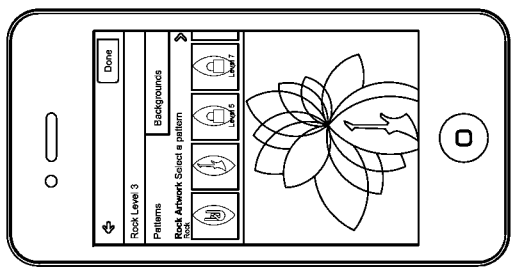
Figure 19:
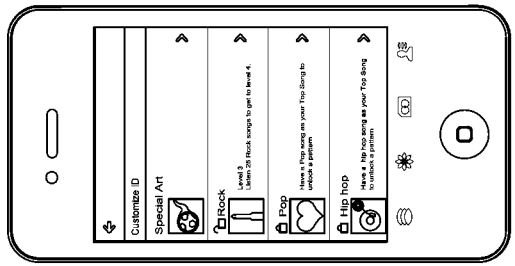
Figure 26:
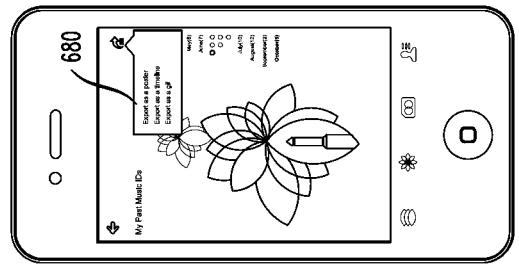
FIGS. 26-29 show screen shots of the player of FIGS. 5-8 in connection with review of an individual's past musical identities.
Figure 27:
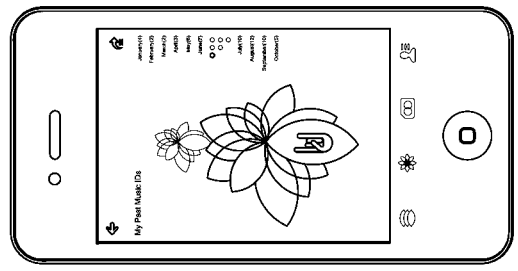
Figure 28:
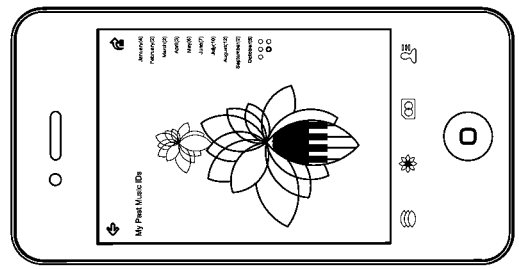

In FIG. 19, special artwork is unlocked for the user. It is worth noting that in some instances, the application 421 is multilingual. In FIG. 21, the user is afforded an opportunity to select a custom background corresponding to a particular genre (here, rock). In FIG. 20, the user is given an opportunity to customize the petals.

FIGS. 22-25 show a user (Geetika) scrolling through her friends' IDs (Amin, Winston, and Seth).

Figure 29:
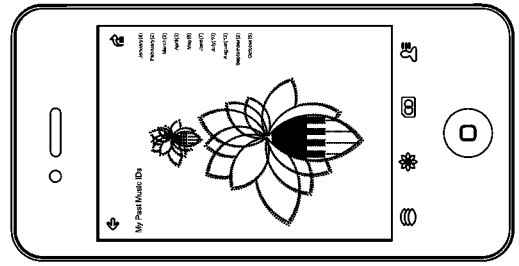

FIGS. 26-29 show screen shots of the player of FIGS. 5-8 in connection with review of an individual's past musical identities, including, in FIG. 29, an opportunity 680 to export same as a poster, timeline, or bitmap (here, gif) image—for example, to a social media web site. Thus, the user can view historical Music IDs as "snapshots in time."

FIG. 30 shows a screen shot of the player of FIGS. 5-8 in connection with a social interaction process. In particular, FIG. 30 shows an alternative form 681 of chat.

FIG. 31 shows a screen shot of the player of FIGS. 5-8 in connection with a notification message 682 of a change in an individual's musical identity.

Figure 32:
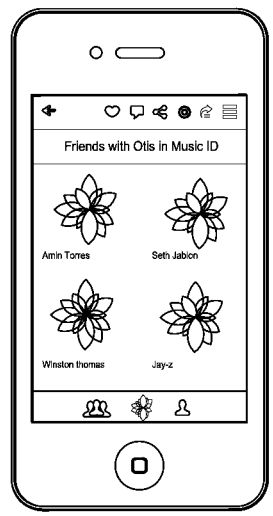
FIGS. 32-33 show screen shots of the player of FIGS. 5-8 in connection with a social interaction process.
Figure 33:

FIGS. 32-33 show screen shots of the player of FIGS. 5-8 in connection with a social interaction process. In particular, FIG. 32 shows an alternate form of display, and in FIG. 33, statistics 690 for the user are compared to statistics 692 for one of the friends, in terms of actual lists of songs in the top 12 (or other number).

As noted, the embodiment of FIG. 4 with a locally stored music library 425 is a non-limiting example. FIG. 36 shows an alternative embodiment 3600 for use with a streaming music service provided by remote streaming music server 3624. A remote music library 3625 is on, or accessible to, server 3624. Elements 3604, 3606, 3610, 3616, 3618, 3602, 3612, and 3627 are analogous to respective elements 404, 406, 410, 416, 418, 402, 412, and 427 in FIG. 4. Instead of music player application 423, streaming music player application 3623 is provided for playing music streamed from server 3624. Music ID application 3621 is similar to application 421 but instead interfaces with application 3623 and/or server 3624 to obtain the required information for carrying out the calculations described elsewhere herein.

Recapitulation

Given the discussion thus far, it will be appreciated that, in general terms, an exemplary method, according to an aspect of the invention, includes the step of scoring each of a plurality of media clips (e.g., songs as in the examples but could also be video clips or the like) accessed (e.g., listened to or viewed) by a user (e.g., in a musical or video library or via streaming) by analyzing metadata (e.g., play count, last play, genre) associated with the media clips. A further step includes selecting a representative subset of media clips based on the scoring. A still further step includes displaying a visual representation of the representative subset of the media clips (e.g., flower design).

Furthermore, given the discussion thus far, it will be appreciated that, in general terms, another exemplary method, according to another aspect of the invention, includes the step 3404 of scoring each of a plurality of media clips accessed by a user, based at least on play count. Each of the media clips has a corresponding one of a plurality of genres (e.g., music dramas discussed above; drama, comedy, western, etc. for video clips). A further step 3406 includes scoring each of the plurality of genres based at least on the play count (most recent play can also be used) for those of the media clips contained therein. A still further step 3408 includes selecting a representative subset of the media clips having a distribution of the genres based on the step 3406 of scoring each of the plurality of genres.

The media clips could include, for example, video clips or songs.

In some cases, songs are streamed from a remote server 3624 to a device 3600 of the user. In another aspect, songs are located in a musical library 425 on a device 400 of the user.

In some instances, an additional step includes determining the distribution of the genres in the representative subset in proportion to representation of the genres as a fraction of a total number of the songs in the musical library. For example, if there are 12 songs in the representative subset, and library 425 includes $1/12$ classical, $1/12$ jazz, $7/12$ rock, and $3/12$ folk, then there will be 1 classical song, 1 jazz song, 7 rock songs, and 3 folk songs in the 12-song representative subset.

Songs to populate each of the genres can be selected in a variety of ways. In some instances, each of the genres is populated by selecting corresponding ones of the songs based on play count and/or most recent play time.

As noted, one or more embodiments further include displaying a visual representation 606 of the representative subset of songs. This can include, for example, displaying a geometric shape 602 for each song in the representative subset of songs. Each of the geometric shapes 602 has a color based on a corresponding song genre and/or a size based on play count.

As noted, in a non-limiting example, the geometric shapes 602 have a flower-petal shape, and the geometric shapes are displayed as petals of a flower 604.

Processor 402 may execute application 421 and send data to a screen buffer of screen 410 or the like to effectuate the display of the visual representation.

In another aspect, a further step includes exporting data representative of the representative subset of songs to a social media service. In some cases, historical data regarding previously-calculated representative subsets of songs is maintained. See FIGS. 26-29. In some such cases, the exporting step includes at least exporting as a timeline.

In some cases, the musical library is stored in persistent storage of a computing device 300 or 400 or the like (e.g., digital music player, smart phone with digital music player capability, tablet device, laptop computer, desktop computer) having a music player application 423 stored therein. Further steps in such a case includes providing a music identity application 421 stored in the persistent storage of the computing device; and obtaining the play count, using the music identity application 421 executing on a processor 402 or 320 of the computing device, to obtain same from the music player application 423 executing on the processor of the computing device. In such cases, the steps 3404, 3406, 3408 of scoring the plurality of songs, scoring the plurality of genres, and selecting the representative subset are carried out by the music identity application 421 executing on the processor of the computing device.

In some cases, the musical library is stored in persistent storage of a portable media player 400 (e.g., digital music player or smart phone with digital music player capability) having a music player application 423 stored therein. When a user shares a song PNO 2008 also stores it in the backend application via services; it is stored in database 154. This will allow PNO 2008 to do things such as send notification based on musical preferences that are gleaned from user's IDs and/or the corresponding raw data. A further step includes providing a music identity application 421 stored in the persistent storage of the portable media player. The steps 3404, 3406, 3408 of scoring the plurality of songs, scoring the plurality of genres, and selecting the representative subset are carried out by the music identity application executing on the processor of the portable media player. In some instances, only a single application is used (for example, where a streaming application is used rather than a locally stored library, or where a single application carries out functionality of 421 and 423).

Further possible steps include uploading data to a social web site to share with friends, and/or downloading data from a social web site (data that friends desire to share with the user).

Another aspect involves PNO 2008 obtaining (raw) data associated with the Music ID from many users and generating offers, such as targeted offers, based on same.

Still another aspect involves the social network site operator obtaining Music ID data for users and displaying same on their social media pages.

System and Article of Manufacture Details

Embodiments of the invention can employ hardware and/or hardware and software aspects. Software includes but is not limited to firmware, resident software, microcode, etc. Software might be employed, for example, in connection with one or more of a smart phone or other portable media player type device, a terminal 122, 124, 125, 126, a reader 132, payment devices such as cards 102, 112, 1302, 1420, a host, server, and/or processing center 140, 142, 144 (optionally with data warehouse 154) of a merchant, issuer, acquirer, processor, or operator of a network 2008 operating according to a payment system standard (and/or specification), a desktop computer 300, and the like. Firmware might be employed, for example, in connection with payment devices such as cards 102, 112, 1302, 1420 and reader 132. Firmware provides a number of basic functions (e.g., display, print, accept keystrokes) that in themselves do not provide the final end-use application, but rather are building blocks; software links the building blocks together to deliver a usable solution.

Figure 3:
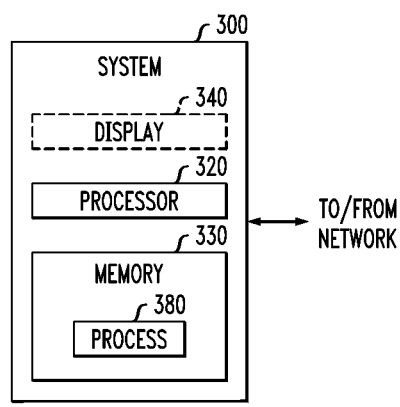
FIG. 3 is a block diagram of an exemplary computer system useful in one or more embodiments of the invention.

FIG. 3 is a block diagram of a system 300 that can implement part or all of one or more aspects or processes of the invention. As shown in FIG. 3, memory 330 configures the processor 320 (which could correspond, e.g., to processor portions 106, 116, 130; a processor of a reader 132; processors of remote hosts in centers 140, 142, 144; processors of hosts and/or servers implementing various functionality, a processor of a desktop computer, processor 402, and the like) to implement one or more aspects of the methods, steps, and functions disclosed herein (collectively, shown as process 380 in FIG. 3). Different method steps can be performed by different processors. The memory 330 could be distributed or local and the processor 320 could be distributed or singular. The memory 330 could be implemented as an electrical, magnetic or optical memory, or any combination of these or other types of storage devices (including memory portions as described above with respect to cards 102, 112). It should be noted that if distributed processors are employed, each distributed processor that makes up processor 320 generally contains its own addressable memory space. It should also be noted that some or all of computer system 300 can be incorporated into an application-specific or general-use integrated circuit. For example, one or more method steps could be implemented in hardware in an ASIC rather than using firmware. Display 340 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability in processors 402, 320, or by any combination of the foregoing or other processors described herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 300, 400 can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance. Unit 300 is representative of a server and also of a laptop, tablet, or desktop computer of a user.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 300 as shown in FIG. 3) running a server program. It will be understood that such a physical server may or may not include a display, keyboard, or other input/output components. A "host" includes a physical data processing system (for example, system 300 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the elements shown in the figures. In one or more embodiments, the modules include a music player application module to implement block 423 and a music identity application module to implement block 421; and/or a streaming music player application module to implement block 3623 and a corresponding music identity application module to implement block 3621. Modules may also be provided to implement streaming music server 3624; the back end application on PNO server 3799, the social network application on server 3797, an on-line media purchasing service such as the iTunes STORE from Apple Inc., and the like. The method steps can then be carried out using the distinct software modules of the system, as described above, executing on one or more hardware processors of the portable media devices, personal computers, smart phones, and so on. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures. One or more embodiments use Objective C for the application 412, Java for the backend application on back end server 3799 of PNO 2008, and communication between them is via JavaScript Object Notation (JSON). In some instances, calculations are performed locally on the device, such as device 400, and pertinent data and/or results are stored on or in association the back end server 3799 together with the accumulated points and the like.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
receiving metadata associated with a plurality of media clips stored on a non-transitory computer-readable recordable storage medium and accessed by a user via at least one digital media player;
scoring each of said media clips accessed by said user, based at least on a respective play count read from said metadata, each of said media clips having a corresponding one of a plurality of genres read from said metadata;
scoring each of said plurality of genres based at least on said play count for those of said media clips contained therein;
selecting from said media clips stored on said non-transistory computer-readable recordable storage medium a representative subset of said media clips having a distribution of said genres proportionate to a distribution of said genres determined for said media clips from which said representative subset of said media clips are selected, said distributions of said genres determined using scores from said step of scoring each of said plurality of genres; and
displaying, by said at least one digital media player, a graphic visual representation of a media identity of said user by conveying individualized information for each said media clips in said representative subset of said media clips.

2. The method of claim 1, wherein said media clips comprises video clips.

3. The method of claim 1, wherein said media clips comprises songs.

4. The method of claim 3, wherein said songs are streamed from a remote server to said at least one digital media player.

5. The method of claim 3, wherein said songs are located in a musical library on said at least one digital media player.

6. The method of claim 5, wherein said scoring of each of said songs accessed by said user is further based on most recent play time.

7. The method of claim 6, further comprising populating each of said genres in said representative subset by selecting corresponding ones of said songs based at least on said play count and said most recent play time.

8. The method of claim 5, further comprising exporting data representative of said representative subset of said songs to a social media service.

9. The method of claim 8, further comprising maintaining historical data regarding previously-calculated representative subsets of said songs; wherein said exporting comprises exporting as a timeline.

10. The method of claim 5, wherein said musical library is stored in persistent storage of said at least one digital media player, said at least one digital media player comprising a computing device having a music player application stored therein, further comprising:
providing a music identity application stored in said persistent storage of said computing device; and
obtaining, with said music identity application executing on a processor of said computing device, from said music player application executing on said processor of said computing device, said play count;
wherein said steps of scoring said plurality of songs, scoring said plurality of genres, and selecting said representative subset are carried out by said music identity application executing on said processor of said computing device.

11. The method of claim 5, wherein said musical library is stored in persistent storage of said at least one digital media player, said at least one digital media player comprising a portable media player having a music player application stored therein, further comprising providing a music identity application stored in said persistent storage of said portable media player, wherein said steps of scoring said plurality of songs, scoring said plurality of genres, and selecting said representative subset are carried out by said music identity application executing on said processor of said portable media player.

12. The method of claim 3, further comprising determining said distribution of said genres in said representative subset in proportion to representation of said genres as a fraction of a total number of said songs in said musical library.

13. The method of claim 12, further comprising populating each of said genres in said representative subset by selecting corresponding ones of said songs based at least on said play count.

14. The method of claim 3, wherein said displaying of said graphic visual representation comprises displaying a geometric shape for each song in said representative subset of said songs, each of said geometric shapes having a color based on a corresponding song genre, wherein said graphic visual representation is a representation of a dynamic musical identity of said user based on said play counts over time.

15. The method of claim 3, wherein said displaying of said graphic visual representation comprises displaying a geometric shape for each song in said representative subset of said songs, each of said geometric shapes having a size based on play count, wherein said graphic visual representation is a representation of a dynamic musical identity of said user based on said play counts over time.

16. The method of claim 3, wherein said displaying of said graphic visual representation comprises displaying a geometric shape for each song in said representative subset of said songs, each of said geometric shapes having a color based on a corresponding song genre and a size based on play count, wherein said graphic visual representation is a representation of a dynamic musical identity of said user based on said play counts over time.

17. The method of claim 1, wherein said graphic visual representation comprises a plurality of geometric shapes forming a flower-petal shape, and wherein said displaying comprises displaying said geometric shapes as petals of a flower, wherein said flower-petal shape is a representation of a dynamic musical identity of said user based on said play counts over time.

18. An apparatus comprising:
a memory; and
at least one processor, coupled to said memory, and operative to:
score each of a plurality of media clips accessed by a user with said apparatus, based at least on play count, each of said media clips having a corresponding one of a plurality of genres;
score each of said plurality of genres based at least on said play count for those of said media clips contained therein;
select a representative subset of said media clips having a distribution of said genres proportionate to a distribution of said genres determined for said media clips from which said representative subset of said media clips are selected, said distributions of said genres determined using scores from said scoring each of said plurality of genres; and
display a graphic visual representation of a media identity of said user by conveying individualized information for each said media clips in said representative subset of said media clips.

19. The apparatus of claim 18, wherein said media clips comprise songs.

20. The apparatus of claim 19, wherein said songs are streamed from a remote server to said apparatus.

21. The apparatus of claim 19, wherein said songs are located in a musical library in said memory.

22. The apparatus of claim 21, wherein said at least one processor is further operative to determine said distribution of said genres in said representative subset in proportion to representation of said genres as a fraction of a total number of said songs in said musical library.

23. The apparatus of claim 22, wherein said at least one processor is further operative to populate each of said genres in said representative subset by selecting corresponding ones of said songs based at least on said play count.

24. The apparatus of claim 19, wherein said at least one processor is further operative to score each of said songs accessed by said user based on most recent play time.

25. The apparatus of claim 24, wherein said at least one processor is further operative to populate each of said genres in said representative subset by selecting corresponding ones of said songs based at least on said play count and said most recent play time.

26. The apparatus of claim 19, wherein said at least one processor is further operative to display said graphic visual representation by displaying a geometric shape for each song in said representative subset of said songs, each of said geometric shapes having a color based on a corresponding song genre and a size based on play count, wherein said graphic visual representation is a representation of a dynamic musical identity of said user based on said play counts over time.

27. The apparatus of claim 26, wherein said geometric shapes have a flower-petal shape, and wherein said at least one processor is further operative to display said geometric shapes as petals of a flower.

28. An apparatus comprising:
means for scoring each of a plurality of media clips accessed by a user, based at least on play count, each of said media clips having a corresponding one of a plurality of genres;
means for scoring each of said plurality of genres based at least on said play count for those of said media clips contained therein;
means for selecting a representative subset of said media clips having a distribution of said genres proportionate to a distribution of said genres determined for said media clips from which said representative subset of said media clips are selected, said distributions of said genres determined using scores from said scoring each of said plurality of genres; and
means for displaying a graphic visual representation of a media identity of said user by conveying individualized information for each said media clips in said representative subset of said media clips.

29. An article of manufacture comprising a computer program product, said computer program product comprising:
a tangible computer-readable recordable storage medium, storing in a non-transitory manner computer readable program code, the computer readable program code comprising:
computer readable program code configured to score each of a plurality of media clips accessed by a user with said apparatus, based at least on play count, each of said media clips having a corresponding one of a plurality of genres;
computer readable program code configured to score each of said plurality of genres based at least on said play count for those of said media clips contained therein;
computer readable program code configured to select a representative subset of said media clips having a distribution of said genres proportionate to a distribution of said genres determined for said media clips from which said representative subset of said media clips are selected, said distributions of said genres determined using scores from said scoring each of said plurality of genres; and
computer readable program code configured to display a graphic visual representation of a media identity of said user by conveying individualized information for each said media clips in said representative subset of said media clips.

* * * * *